United States Patent [19]

Jaenecke

[11] Patent Number: 5,764,856
[45] Date of Patent: Jun. 9, 1998

[54] PARALLEL NEURAL NETWORKS HAVING ONE NEURAL NETWORK PROVIDING EVALUATED DATA TO ANOTHER NEURAL NETWORK

[75] Inventor: Peter Jaenecke, Straubenhardt, Germany

[73] Assignee: Alcatel N.V., Rijswijk, Netherlands

[21] Appl. No.: 303,328

[22] Filed: Sep. 9, 1994

[30] Foreign Application Priority Data

Sep. 11, 1993 [DE] Germany .................. 43 30 847.3

[51] Int. Cl.$^6$ ................................. G06F 15/18
[52] U.S. Cl. ................ 395/11; 395/21; 395/24
[58] Field of Search ................. 395/10–11, 61, 395/50–51, 20–25, 27; 382/155–159; 365/49

[56] References Cited

U.S. PATENT DOCUMENTS

| | | | |
|---|---|---|---|
| 5,023,833 | 6/1991 | Baum et al. | 365/49 |
| 5,075,871 | 12/1991 | Weidman | 395/24 |
| 5,080,464 | 1/1992 | Toyoda | 395/25 |
| 5,546,505 | 8/1996 | Austvold et al. | 395/26 |

FOREIGN PATENT DOCUMENTS

| | | | |
|---|---|---|---|
| 0395150 | 10/1990 | European Pat. Off. | G06F 15/80 |
| 1638717 | 3/1991 | U.S.S.R. | G06G 7/60 |
| 1816325 | 5/1993 | U.S.S.R. | G06G 7/60 |

OTHER PUBLICATIONS

Hattori et al, "Improved multidirectional associative memories for training sets including common terms"; IJCNN, pp. 172–177 vol. 2, 7–11 Jun. 1992.

Tseng et al, "A fast supervised learning scheme for recurrent neural networks with application to associative memory design"; 1993 IEEE International conference on neural networks, pp. 789–793 vol. 2, 28 Mar.–1 Apr. 1993.

Wang, "Characterization of a higher–order associative memory that uses product units"; 1993 International Conference on systems, man and cyberspace, pp. 636–639 vol. 2, 17–20 Oct. 1993.

(List continued on next page.)

*Primary Examiner*—Tariq R. Hafiz
*Attorney, Agent, or Firm*—Ware, Fressola, Van Der Sluys & Adolphson LLP

[57] ABSTRACT

A data processing system is provided that consists of a connection of a first neural network ($N_1$) with at least one other neural network ($N_{21}, N_{22}, \ldots, N_{2n}$). The first neural network ($N_1$) and the at least one other neural network ($N_{21}, N_{22}, \ldots, N_{2n}$) is an associative memory. First input data ($E_0$) are supplied to both the first neural network ($N_1$) and also to at least the one other neural network ($N_{21}, N_{22}, \ldots, N_{2n}$). Data ($E_{11}, E_{12}, \ldots, E_{1n}$) which are evaluated by at least the one other neural network ($N_{21}, N_{22}, \ldots, N_{2n}$), are supplied as further input data ($E_1$) to the first neural network ($N_1$).

3 Claims, 3 Drawing Sheets

OTHER PUBLICATIONS

Toborg, Scott T.: Hwang, Kai: "Cooperative Vision Integration Through Data-Parrallel Neural Computations". In: IEEE Transactions on Computers, Dec. 1991, vol. 40, No. 12, S. 1368–1379.

Widrow, Bernard; Winter, Rodney: "Neural Nets for Adaptive Filtering and Adaptive Pattern Recognitions", In: Computer, Mar. 1988, S-25-39.

Jang, Ju-Seog: et al: "Optical Implementation of the Hopfield model for two-dimensional associative memory". In: Optices Letters, Mar. 1988, vol. 13, No. 3, S.248–251.

Communication Engineering Pocket Edition, Dr. Eng. K. Steinbuch Chapter 12.6.1 "The Learning Matrix", Spring Publishers, Berlin/Heidelberg/New York; 1967, pp. 1416 to 1423.

"An Introduction to Computing with Neural Nets" by Richard P. Lippmann, IEEE ASSP Magazine, Apr. 1987 –pp. 4–23.

Neural Networks, Bd. 5.Nr2, 1992, Oxford GB, pp. 305–311, Tabary "Control of a redundant articulated system by neural networks".

IJCNN-91 International Joint Conference on Neural Networks, BDI.8. Jul. 1991, Seattle, USA pp. 263–268, LO "A neural piecewise linear classifier for pattern classification".

IJCNN-91 International Joint Conference on Neural Networks, pp. 2.8 Jul. 1991 Seattle USA, Rabelo "Intelligent control of a robotic arm using hierarchical neural network systems".

IEEE Transactions on Industrial Electronics and Control Instrumentation, Bd. 39, Nr. 6, Dec. 1992, NY US, pp. 537–541.

SAGA "Mobile robot control by neural networks using self-supervised learning".

PARALLEL NEURAL NETWORKS HAVING ONE NEURAL NETWORK PROVIDING EVALUATED DATA TO ANOTHER NEURAL NETWORK

TECHNICAL FIELD

The invention concerns a system and a method for data processing by neural networks

BACKGROUND OF THE INVENTION

The use of neural networks generally creates the problem that input data, which are supplied to the neural network without appropriate preprocessing, cannot be optimally processed by the latter without appropriate preprocessing.

Several methods for preprocessing prior to processing in a neural network are known in the state of the art. For example, U.S. Pat. No. 3,287,649 describes a preprocessing method required to prepare input signals for further processing by neurons.

Furthermore, for the case where an associative memory is provided, e.g. the STEINBUCH learning matrix in the state of the art, it is used to assign input data to output data under conditional probabilities. In this instance a "learning phase" is divided into a "can phase" (Communication Engineering Pocket Edition; Dr. Eng. K. Steinbuch, chapter 12.6.1 "The Learning Matrix"; Springer Publishers, Berlin/Heidelberg/New York; 1967; pp. 1416 to 1423).

In the same way, other neural networks and data processing methods with neural networks are known in the state of the art, in which a coding process must be used before the data can be processed. In this instance the HOPFIELD-network is used for example, to undertake associative storage or solve optimization problems ("An Introduction to Computing with Neural Nets", Richard P. Lippmann; IEEE ASSP Magazine, April 1987, pp. 4–23).

All the methods mentioned so far are a function of the respective special application.

Therefore, this means that optimum preprocessing must be found for each case of the present application, and the found method cannot be universally applied.

SUMMARY OF THE INVENTION

It is the task of this invention to provide a system and a method which can be universally applied.

The invention fulfills the task by a data processing system consisting of a connection of a first neural network with at least one other neural network, in which first input data are supplied to both the first neural network and also to at least the one other neural network, where data, which are evaluated by at least the one other neural network, are supplied as further input data to the first neural network. The methodology of the present invention is a data processing method, in which first input data are supplied to both a first neural network, and to at least one other neural network, where at least the one other neural network makes a first evaluation of the first input data, from which evaluated data are produced and supplied to the first neural network as further input data for further evaluation.

An advantage of the invention lies in that the system of the invention can be used for different applications.

It is not necessary to find an optimum coding for each application by means of a coding process, rather the coding is application-independent. Accordingly, e.g. either an error-tolerant assignment or a specific assignment can take place with the use of an associative memory and as a function thereof, depending on the training phase.

Another advantage is that the assured recognition of e.g sought associated vectors is increased with another neural network, because an additional factor must be recognized and must coincide.

The system is particularly advantageous if the neural networks are associative memories.

In one aspect of the present invention, the respective evaluated data and a control information are supplied to a decision element S, that determines which respective evaluated data are sent to the first neural network.

Another feature of the invention is that the data to be sent to the first neural network can be calculated by the decision element.

In a further feature of the invention, the associative memories consist of memory matrixes with storage places that will be occupied in a random manner Another feature of the invention is that the storage places in the associative memory matrixes are occupied in a random manner, therefore in accordance with a special process for a determined application.

A still further feature is that the memory matrix is trained by one of the neural networks, or application-specifically occupied, and the other neural network is occupied according to a known and previously established process. The technology known from the state of the art can be used in this instance.

In addition, the present invention can use other neural networks for a respective special feature of the input data.

Lastly, the system of the invention can be preferably used as an optical switch.

BRIEF DESCRIPTION OF THE DRAWINGS

In the following, a configuration example is explained by means of the figures, in which.

BEST MODE FOR CARRYING OUT THE INVENTION

Figure 1:
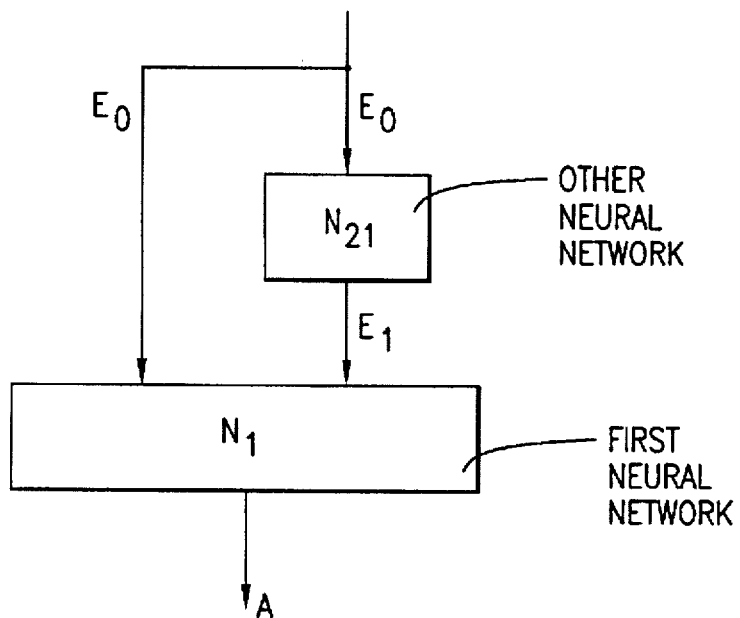
FIG. 1 is a block circuit diagram of a configuration example.

The invention will now be explained in more detail by means of the configuration example in FIG. 1.

A data processing system consists of a connection of neural networks. A first neural network $N_1$ is connected to at least one other network $N_{21}, N_{22}, \ldots, N_{2n}$, where this configuration example only contains a single other neural network $N_{21}$.

Input data $E_0$ are supplied to both the first neural network $N_1$ and the other neural network $N_{21}$. The other neural network $N_{21}$ evaluates the input data $E_0$, from which the evaluated data $E_1$ are formed, which are also supplied as further input data to the first neural network $N_1$.

The first neural network $N_1$ evaluates the two input data $E_0$ and $E_1$, and produces output data A as a result.

The following data processing sequence takes place if the above designated neural networks are associative memories.

An associative storage in the associative memory has the task of storing m vector pairs $(\vec{k}_1, \vec{q}_1)$, $(\vec{k}_2, \vec{q}_2)$, . . . ( $\vec{k}_m, \vec{q}_m$) in such a way, that in the event the input value $q_i$ is applied for i=1, 2, . . . m from the input data, the correspondingly fitting $k_i$ is output for i=1, 2, . . . m, therefore it is associated. In this case, and from now on, "applied" means the multiplication of a vector by a matrix, and a suitable threshold value operation for the resulting vector.

When neural networks are used, the above mentioned vector pairs must be trained during a training phase., before a resulting $\vec{k}_1$ can be obtained in a useful phase from an entered input value $\vec{q}_i$.

During the training phase of the process and the system of the invention, the at least one other neural network $N_{21}$, to which the input data $\vec{q}_i$ are also applied, first produces other data $\vec{b}_i$ for i=1, 2, . . . m. To produce the other data $\vec{b}_1$, a memory matrix of the other neural network $N_{21}$ is occupied in a random manner, thus "by chance".

The $\vec{b}_i$ vectors for i=1, 2, . . . m extend the respective vectors $\vec{q}_i$ for i=1, 2, . . . m, which is indicated in the following by the symbol "&".

Accordingly, the first neural network $N_1$ is trained for the vector pairs $(\vec{k}_1, \vec{q}_1 \& \vec{b}_1)$, $(\vec{k}_2, \vec{q}_2 \& \vec{b}_2)$, . . . $(\vec{k}_m, \vec{q}_m \& \vec{b}_m)$.

In the useful phase, input data is applied for example to any $\vec{q}_1$, where 1 equals a number in the 1–m range. The respective vector $\vec{b}_1$ results from the use of the one other neural network $N_{21}$. This extends vector $\vec{q}_1$ by $\vec{b}_1$, thus resulting in $\vec{q}_1 \& \vec{b}_1$.

The first neural network $N_1$ associates vector $\vec{k}_1$, which belongs to vector $\vec{q}_1 \& \vec{b}_1$.

As a function of the type of training, different associations can be performed with the above described data processing operation.

One possibility consists in associating the same $\vec{k}$ with similar input vectors $\vec{q}$. This is used for an error-tolerant response when easily varied input vectors are entered.

Another possibility consists in forcing unambiguousness, i.e. associating different output vectors; $\vec{k}$ in spite of similar input vectors $\vec{q}$. This is used to provide an unambiguous assignment of the input vectors to the corresponding output vectors.

The reliability of the assignment of both above described possibilities can be increased as desired. The reliability becomes greater as more components possess the $\vec{b}_i$ vector. This can be achieved by expanding the memory matrix, or by adding another network.

Adding other networks, thus enlarging the other vector $\vec{b}_i$, is explained in the following by means of FIG. 2.

As described earlier, the system according to the invention consists of a first neural network $N_1$ and of at least one other neural network $N_{21}, N_{22}, \ldots, N_{2n}$.

The input data $E_0$ are supplied to each other neural network $N_{21}, N_{22}, \ldots, N_{2n}$. Each other neural network $N_{21}, N_{22}, \ldots, N_{2n}$ evaluates and forms the evaluated data $E_{11}, E_{12}, \ldots, E_{1n}$. These evaluated data are also supplied to the first neural network $N_1$ and the output data A are formed from this multitude of data.

In the event the indicated neural networks are built as associative memories, the result is that each other neural network $N_{21}, N_{22}, \ldots, N_{2n}$ produces a corresponding other vector $b_{i1}, b_{i2}, \ldots, b_{in}$ for i=1, 2, . . . m. Each other neural network represents a special feature of the input data $E_0$, which when added, increases the reliability of the assignment significantly.

Accordingly, the network is trained during the neural network's training phase for the following vector pairs:

$(\vec{k}_1, \vec{q}_1 \& \vec{b}_{11} \& \vec{b}_{22} \& \ldots b_{1n})$,
$(\vec{k}_2, \vec{q}_2 \& \vec{b}_{21} \& \vec{b}_{22} \& \ldots b_{2n})$,
$(\vec{k}_m, \vec{q}_m \& \vec{b}_{m1} \& \vec{b}_{m2} \& \ldots b_{mn})$ In the same way, in the useful phase first the $\vec{b}_{11}, \vec{b}_{12}, \ldots, \vec{b}_{1n}$ are assigned to the neural networks $N_{21}, N_{22}, \ldots, N_{2n}$ by applying $q_1$, where the subscript 1 equals a number from the range of 1 to m, and are then associated to the corresponding vector $\vec{k}_1$ through vector $\vec{q}_1 \& \vec{b}_{11} \& \vec{b}_{12} \& \ldots b_{1n}$. In this case, the reliability of the association is increased insofar as other neural networks $N_{21}, N_{22}, \ldots, N_{2n}$ were added, because the vector of each applied $\vec{q}_1$ is expanded by the respective $\vec{b}_{11}, \vec{b}_{12}, \ldots, b_{1n}$.

Instead of the random occupation of the other neural networks, they can be application-specifically pretrained, where each other neural network corresponds to a certain feature of the input data.

A special application for the system of the invention can be its use as an optical switch. Optical switches are used to establish connections between different nodal points. For example, if there are 64 different nodes between which connections are to be established, there are $2^{64}$ different possibilities. However, only a fraction of these $2^{64}$ possibilities is significant. i.e. is even used.

Using the method of the invention, the system of the invention can establish unambiguous node connections. An overtraining of the network, such as occurs with the usual methods because of the large number of connection possibilities, cannot take place here.

Figure 3:
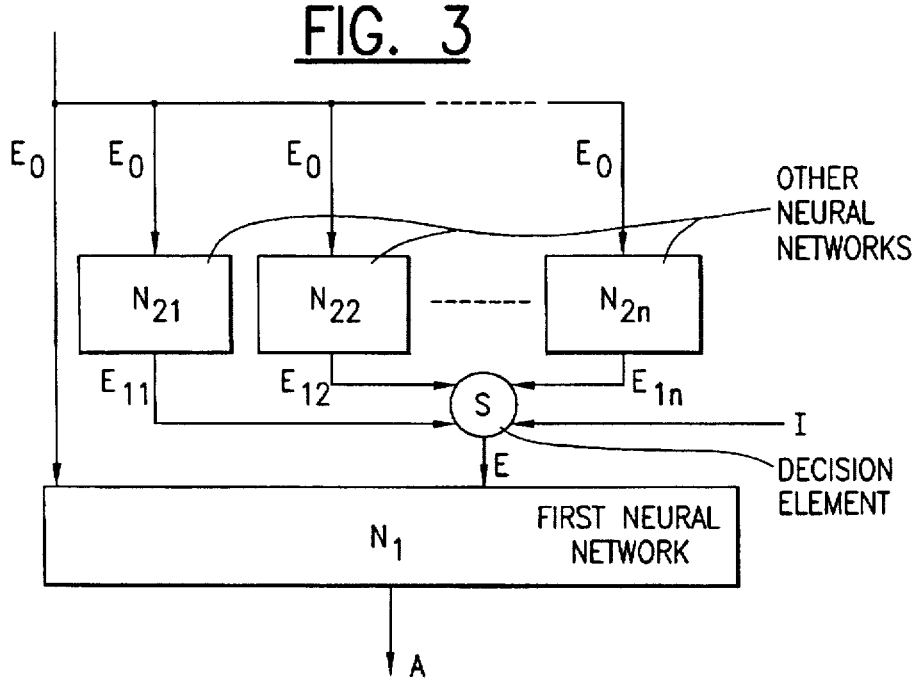
FIG. 3 is a block circuit diagram of a system in which the respective evaluated data are supplied to a decision element, which determines, with the aid of control information supplied to the decision element, which of the respective evaluated data are supplied to the first neural network.

FIG. 3 is explained in the following. In the present configuration example, the data $E_{11}, E_{12}, \ldots, E_{1n}$ that are evaluated by at least one other neural network $N_{21}, N_{22}, \ldots, N_{2n}$, are supplied to a decision element S, instead of to the first neural network $N_1$. This decision element also receives additional control information I. This control information I is a function of the environment in which the system is being used, therefore it corresponds e.g. to the requirement that unambiguousness is desired for an assignment.

The decision element S decides which of the respective evaluated data $E_{11}, E_{12}, \ldots, E_{1n}$ are supplied to the first neural network $N_1$, characterized here by the relayed data E.

The existence of the control information I is not absolutely necessary, because the decision element S is also able to determine by itself which of the respective evaluated data $E_{11}, E_{12}, \ldots, E_{1n}$ must be let through in all cases.

In this instance, the decision element S can also be either a neural network, or correspond to an abstractor, as already described in German patent application P 41 33 965.7

In addition, the decision element S in turn can calculate new data E from the respective evaluated data $E_{11}, E_{12}, \ldots$ ... $E_{1n}$, which are supplied to the first neural network $N_1$. As already described earlier, in this instance E can correspond to one or more of the respective evaluated data $E_{11}$, $E_{12}$, ... $E_{1n}$, or can consist of data E, newly calculated from these evaluated data.

Figure 4:
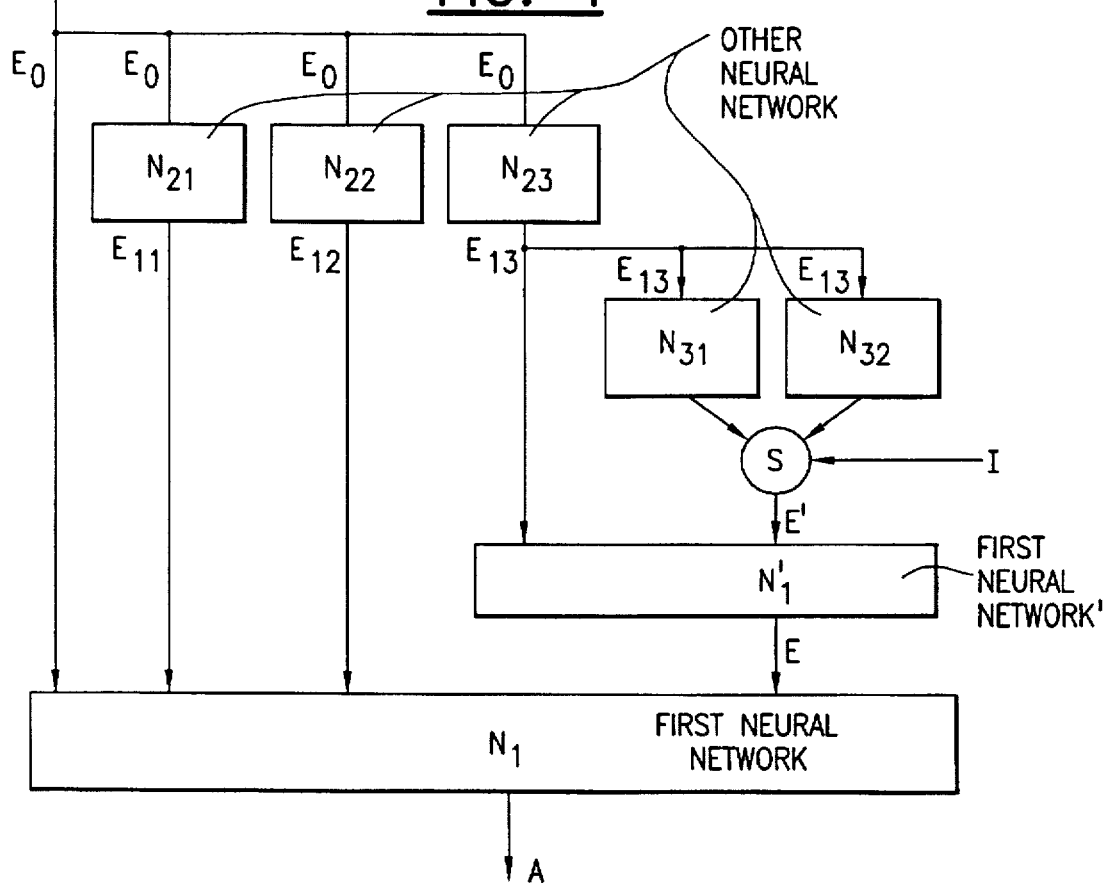
FIG. 4 is a block circuit diagram of a combination of FIGS. 2 and 3.

FIG. 4 will be explained in the following. FIG. 4 depicts a configuration example that is the result of a combination of FIGS. 2 and 3.

Figure 2:
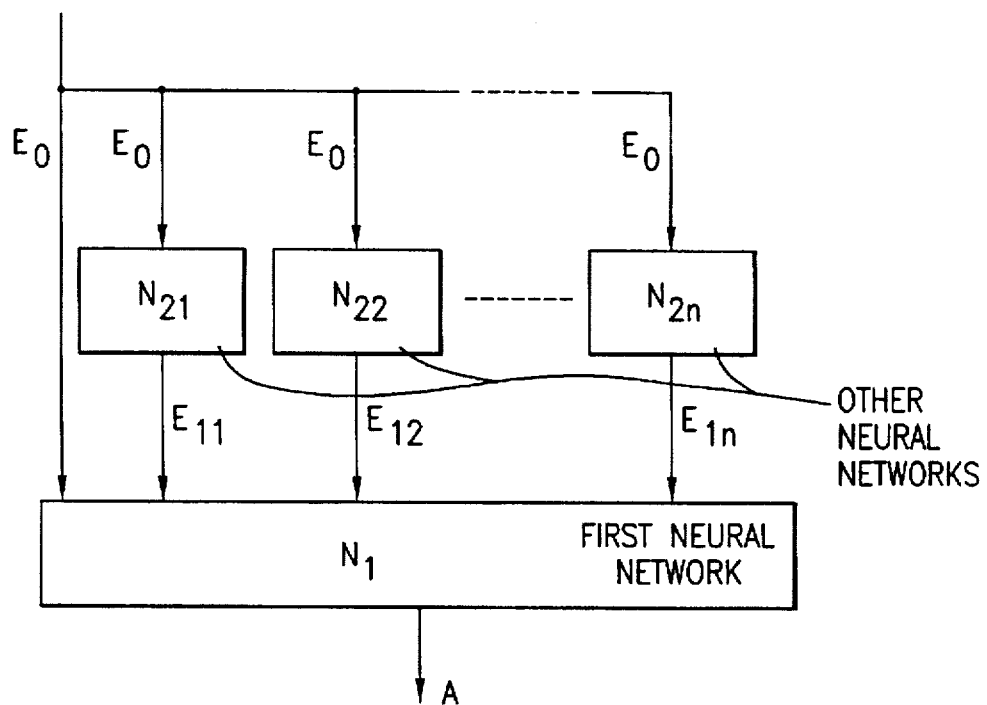
FIG. 2 is a block circuit diagram of the system according to the invention.

The configuration examples of FIGS. 2 and 3 can be combined in any desired way; thus, it is possible to combine two FIGS. 2 and two FIGS. 3 into a new figure.

Figure 5:
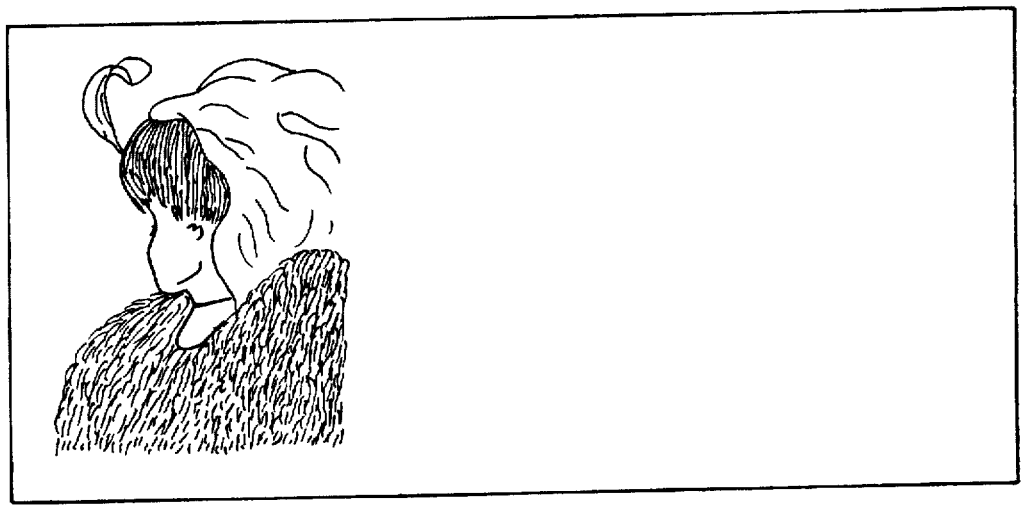
FIG. 5 is an example of a sweep figure to be processed by one of the systems.

By means of FIG. 5, the following explains how the evaluation takes place, particularly in a circuit as in FIG. 3, for example. FIG. 5 shows a so-called sweep figure, which represents the profile of an elderly lady, as well as the bust of a young lady. The respective view of an elderly or a young lady depends on a so-called attention direction.

The view of the young lady corresponds for example to the information contained in the other data $E_{11}$ in FIG. 3. The view of the elderly lady corresponds to the information contained in the other data $E_{12}$, also in FIG. 3.

These data are located simultaneously in decision element S. However, depending on the attention direction, the latter only permits one or the other information of the data to pass through to the neural network $N_1$. In turn, the neural network $N_1$ interprets the received information.

Accordingly, during cognitive processes, the above described circuits can simulate and relay the important attention directions for interpretation.

What is claimed is:

1. A data processing system consisting of a connection of a first neural network ($N_1$) with at least one other neural network ($N_{21}$, $N_{22}$, ..., $N_{2n}$), in which the first neural network ($N_1$) and the at least one other neural network ($N_{21}$, $N_{22}$, ..., $N_{2n}$) is an associative memory, in which first input data ($E_0$) are supplied to both the first neural network ($N_1$) and also to at least the one other neural network ($N_{21}$, $N_{22}$, ..., $N_{2n}$), where data ($E_{11}$, $E_{12}$, ..., $E_{1n}$), which are evaluated by at least the one other neural network ($N_{21}$, $N_{22}$, ..., $N_{2n}$), are supplied as further input data ($E_1$) to the first neural network ($N_1$), wherein the data processing system is used as an optical switch.

2. A system according to claim 1, in which the respective evaluated data ($E_{11}$, $E_{12}$, ..., $E_{1n}$) are supplied to a decision element (S), which determines, with the aid of control information (I) supplied to the decision element, which of the respective evaluated data are supplied to the first neural network ($N_1$).

3. A system according to claim 2, in which the decision element (S) calculates the data (E) to be supplied to the first neural network ($N_1$) from the respective evaluated data ($E_{11}$, $E_{12}$, ..., $E_{1n}$).

* * * * *

UNITED STATES PATENT AND TRADEMARK OFFICE
CERTIFICATE OF CORRECTION

PATENT NO. : 5,764,856
DATED : June 9, 1998
INVENTOR(S) : Jaenecke

It is certified that error appears in the above-identified patent and that said Letters Patent is hereby corrected as shown below:

On the title page: Item

[57] ABSTRACT

Line 7, after "$(N_{21}, N_{22}, ..., N_{2n})$" insert --.--

Line 8, after "$(E_{11}, E_{12}, ..., E_{1n})$" insert --,--

Signed and Sealed this

Fifth Day of January, 1999

Attest:

Attesting Officer

*Acting Commissioner of Patents and Trademarks*